Figure 1:
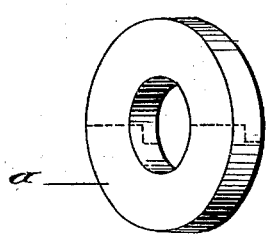

No. 687,489. Patented Nov. 26, 1901.
K. REICHENBACH.
PACKING FOR STUFFING BOXES.
(Application filed Sept. 12, 1901.)
(No Model.)

Witnesses:
Jacob Heller
Ludwig Flum

Inventor:
Karl Reichenbach
per Binger
Attorney

UNITED STATES PATENT OFFICE.

KARL REICHENBACH, OF CARLSRUHE, GERMANY.

PACKING FOR STUFFING-BOXES.

SPECIFICATION forming part of Letters Patent No. 687,489, dated November 26, 1901.

Application filed September 12, 1901. Serial No. 75,180. (No model.)

*To all whom it may concern:*

Be it known that I, KARL REICHENBACH, a subject of the German Emperor, and a resident of Carlsruhe, Germany, have invented certain new and useful Improvements in Packings for Stuffing-Boxes, of which the following is a specification.

The packings for stuffing-boxes used hitherto fail to produce a perfect and lasting joint and do not permit the lubrication of the piston-rods at high temperatures, because the hot steam acting directly upon it rapidly destroys its elasticity and lubricating power by rendering it hard and compact. In this hard state the packing no longer prevents escapes of steam, and owing to the great friction it wears the piston-rod and renders the working of the engine more difficult. Neither is the desired object attained by the well-known packing, which only consists of rings of compressed graphite placed on the piston-rod in a metal sleeve, because this kind of packing does not possess the requisite qualities to obtain the required technical results.

The object of the present invention is a packing combined with graphite rings in which between each pair of rings is arranged a ring made of an elastic material—such as cotton, hemp, or the like—so as to insulate the packing-ring from the action of the steam. The graphite rings resist the heat and are elastic and malleable after being submitted to heat.

With these and other objects in view my invention further consists in the novel details of construction and combination of parts to be clearly described in the following specification and fully set forth in the claim.

Figure 2:
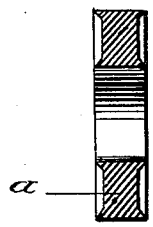
Figure 3:
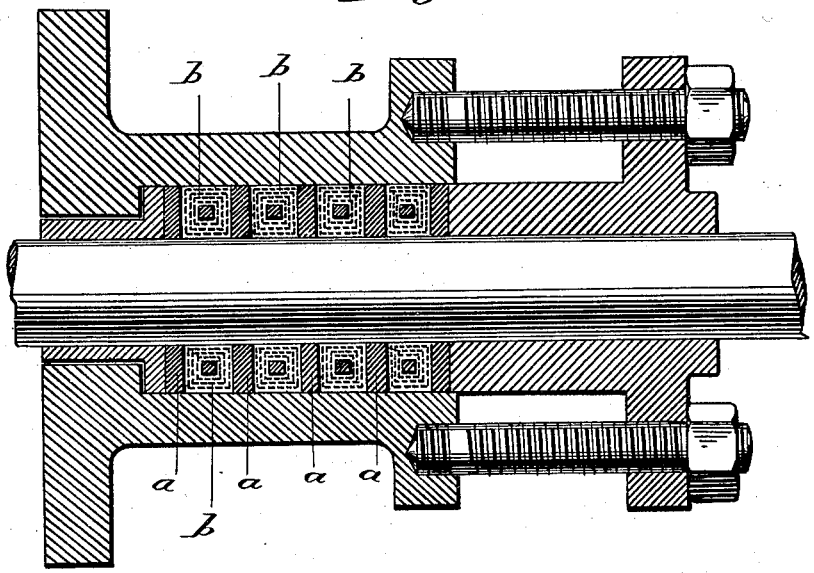

Referring to the accompanying drawings, forming a part of this specification, and in which like characters of reference indicate similar parts throughout the several views, Figure 1 is a perspective view of a circular form of graphite packing. Fig. 2 is a vertical sectional view thereof. Fig. 3 is a longitudinal sectional view of the stuffing-box, showing the application of my invention.

The packing, composed of graphite, is illustrated in a preferable circular form in Fig. 1 of the drawings, being designated by the letter *a*. For the purpose of facilitating its application the same is formed of two sections, as illustrated in Fig. 1 of the drawings, each section carrying tongues which interlock and engage one another when the same are in their normal positions. Between each pair of graphite rings *a* is interposed an elastic packing-ring *b*, of hemp, cotton, or the like, for the purpose of avoiding a direct action of the steam upon the packing-rings.

In the application of my invention a ring of graphite is first mounted upon the piston-rod, with the tongues of the sections interlocking. A ring of hemp, cotton, or the like is then mounted on the rod with its inner circumference contacting therewith and having its entire side engaging the flat side of the graphite ring. A second graphite ring is then mounted on the rod with its side contacting with the side of the hemp ring, the above operation being repeated until the stuffing-box has become filled. The gland slidably fits within the stuffing-box and bears against the outer ring of graphite, the gland being adjusted by means of bolts carried thereby and engaging the annular ring carried by the one end of the stuffing-box. At the rear end of the stuffing-box an annular ring carrying an enlarged collar engages a shoulder formed on the inner circumference of the stuffing-box, at its rear face, and at its front face engages the outer of the graphite rings and serves to secure the same in position.

Having thus fully described my invention, what I claim as new, and desire to secure by Letters Patent, is—

In combination with a stuffing-box, a ring carrying an enlarged collar mounted on the piston-rod with said collar engaging a shoulder formed on the inner circumference of the stuffing-box, graphite rings each formed of two sections, each section carrying interlocking tongues, said rings being mounted on the piston-rod with their tongues interlocking and having their peripheries engaging the inner circumference of the stuffing-box, a ring of hemp or the like mounted on the piston-rod having its flat sides contacting with the side of the graphite ring, a second ring of graphite mounted on the piston-rod with its side contacting with the other side of the said ring of hemp or the like, and a gland slidably mounted on the piston-rod and operating within the said stuffing-box for engagement with the outer of said graphite rings, the gland-carrying bolts engaging the stuffing-box whereby the gland may be moved to adjust the packing-rings, substantially as described.

In testimony whereof I have hereunto set my hand in presence of two witnesses.

KARL REICHENBACH.

Witnesses:
JACOB ADRIAN,
H. W. HARRIS.